Figure 1:
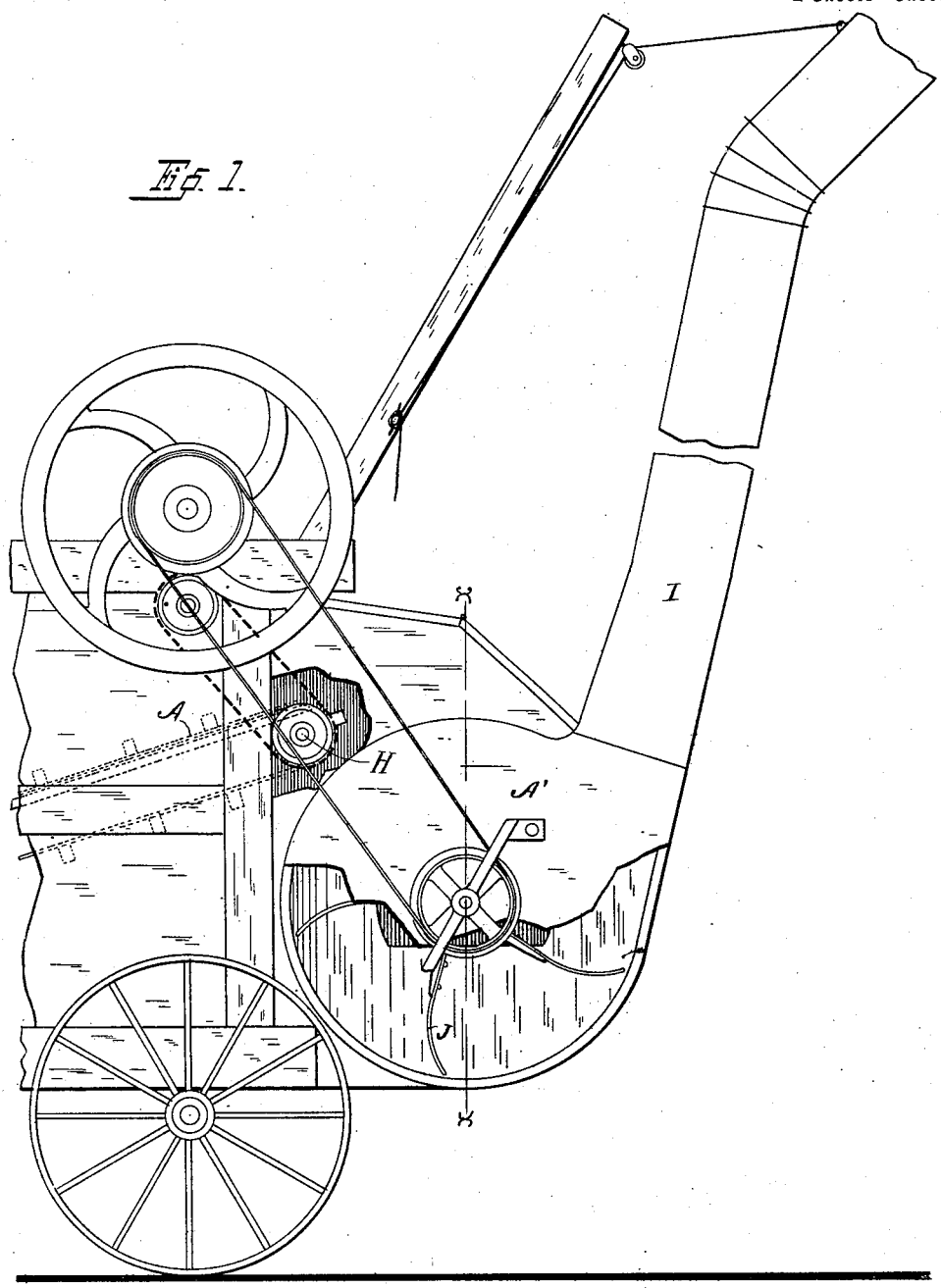

No. 637,247. Patented Nov. 21, 1899.
W. GUTENKUNST.
SEPARATING MECHANISM FOR CORN HUSKERS.
(Application filed Sept. 8, 1898.)

(No Model.) 2 Sheets—Sheet 1.

Witnesses: Inventor.
F. A. Otto William Gutenkunst
N. Roesch By Erwin, Wheeler & Wheeler
Attorneys.

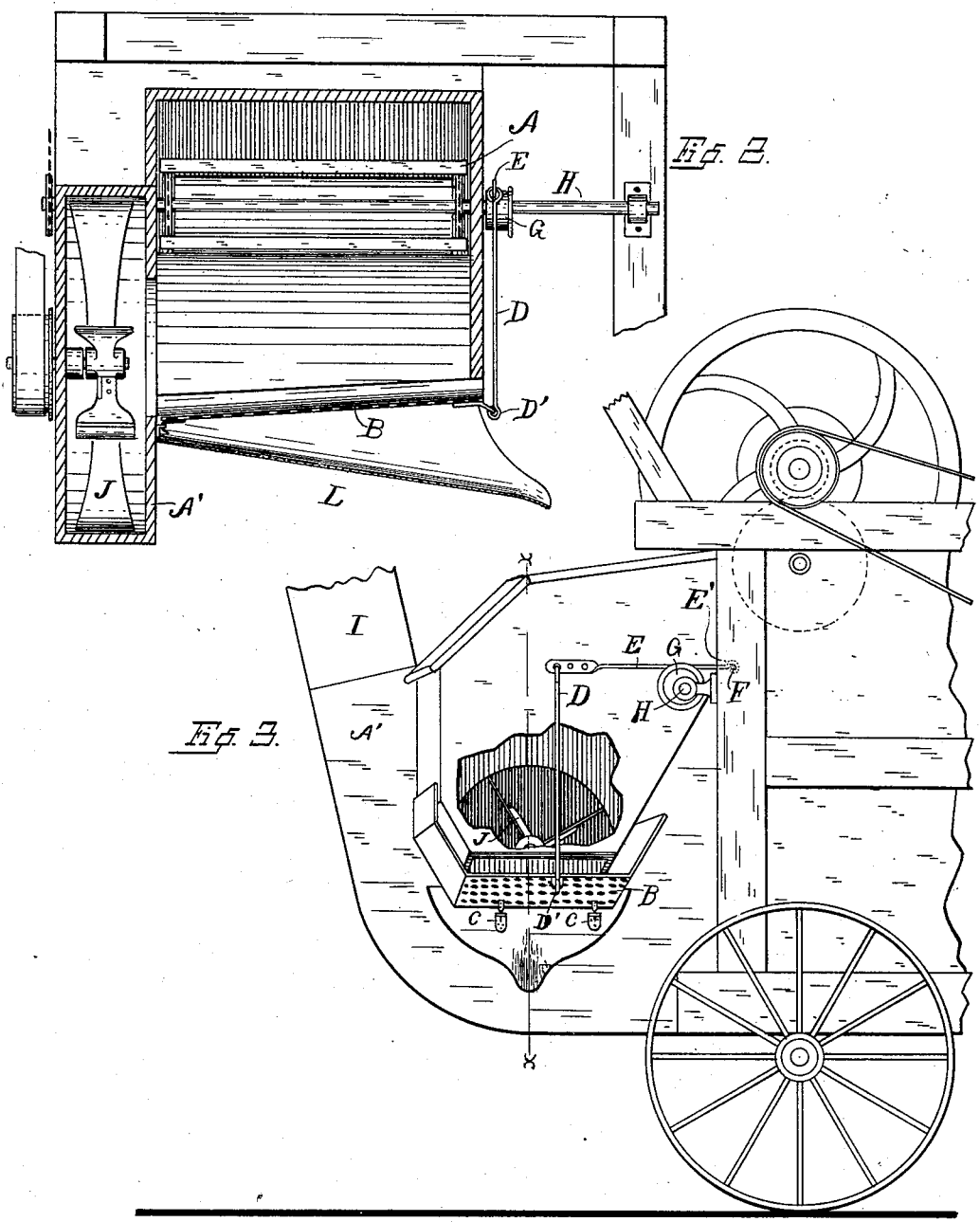

UNITED STATES PATENT OFFICE.

WILLIAM GUTENKUNST, OF MILWAUKEE, WISCONSIN.

SEPARATING MECHANISM FOR CORN-HUSKERS.

SPECIFICATION forming part of Letters Patent No. 637,247, dated November 21, 1899.

Application filed September 8, 1898. Serial No. 690,538. (No model.)

*To all whom it may concern:*

Be it known that I, WILLIAM GUTENKUNST, a citizen of the United States, residing at Milwaukee, in the county of Milwaukee and State of Wisconsin, have invented new and useful Improvements in a Separating Mechanism for Corn-Huskers, of which the following is a specification.

My invention relates to improvements in that class of corn-huskers by which as the ears of corn are husked the stalks are cut or shredded and elevated by a fan-blast, and my improvements pertain more especially to the means employed for separating the shelled corn from the cut or shredded stalks and for conveying such stalks forward into the fan-inclosing casing preparatory to being elevated.

My invention is explained by reference to the accompanying drawings, in which—

Figure 1 represents a side view of the rear end of a corn-husker provided with my improvement, part broken away to show the interior. Fig. 2 is a vertical section drawn on line *x x* of Figs. 1 and 3. Fig. 3 is a side view, part broken away to show the interior.

Like parts are referred to by the same reference-letters throughout the several views.

The corn-husker, stalk cutter or shredder, and the fan-blast elevator are of the ordinary construction, and a description of such parts is omitted as not being necessary to the full understanding of the present invention.

The ears of corn having been husked and removed from the stalks and the stalks having been cut or shredded, they, with such corn as is incidentally shelled from the ears as the corn is being husked, are carried rearward by the conveyer or endless belt A over and deposited upon the screen B. The screen B is supported at one end at the side of the fan-casing A' by hinges or fastenings C C and at its opposite end by the rod D and staple or eyebolt D'. The rod D is suspended from the vibratory lever E. The lever E is connected with the frame of the machine E' at a fixed point by the pivotal bolt F and bears upon an eccentric collar G. The eccentric collar may, however, be operated by other revolving shafts of the machine, if desired.

It will be obvious that as the eccentric collar G is rotated the free or outer end of the screen B will be caused to vibrate upward and downward with each rotation of such shaft, whereby the cut or shredded stalks and corn deposited thereon will be rapidly shaken and thrown forward toward the lower end of the screen, whereby such corn as is deposited upon it with the stalks will be screened out, while the stalks will be gradually thrown forward and into the fan-casing, when it will be driven by the fan-blast up through the duct I to the place of discharge.

J is the fan.

L is the stationary trough through which the corn which is screened out from the stalks is led to a receptacle.

Having thus described my invention, what I claim as new, and desire to secure by Letters Patent, is—

1. In the class of corn-husking machine, in which the stalks are elevated by a fan-blast, the combination with the fan-casing and a revoluble shaft of said machine; of a screen pivoted at its lower discharge end at a fixed point adjacent to the inlet-opening of said fan-casing, and connected at its opposite end with said revoluble shaft; and means for communicating an upward and downward, or vibratory movement from said shaft to the free end of said screen, substantially as and for the purpose specified.

2. In a corn-husking machine, of the class described, the combination with a revoluble shaft of said machine and with the fan-case; of a screen pivotally supported at its discharge end adjacent to the inlet-opening of said fan-case; an eccentric collar mounted upon said revoluble shaft; a lever pivotally connected at a fixed point to said machine and fulcrumed upon said eccentric collar; a connection communicating from the free end of said lever to the free end of said screen, said lever and connection being adapted to commmunicate an upward and downward vibratory movement to the free end of said screen from said revoluble shaft, all substantially as and for the purpose specified.

In testimony whereof I have hereunto set my hand this 2d day of September, 1898.

WILLIAM GUTENKUNST.

Witnesses:
JAS. B. ERWIN,
CHAS. A. GUTENKUNST.